A. G. R. KELLER.
TRAP NEST.
APPLICATION FILED MAR. 4, 1914.

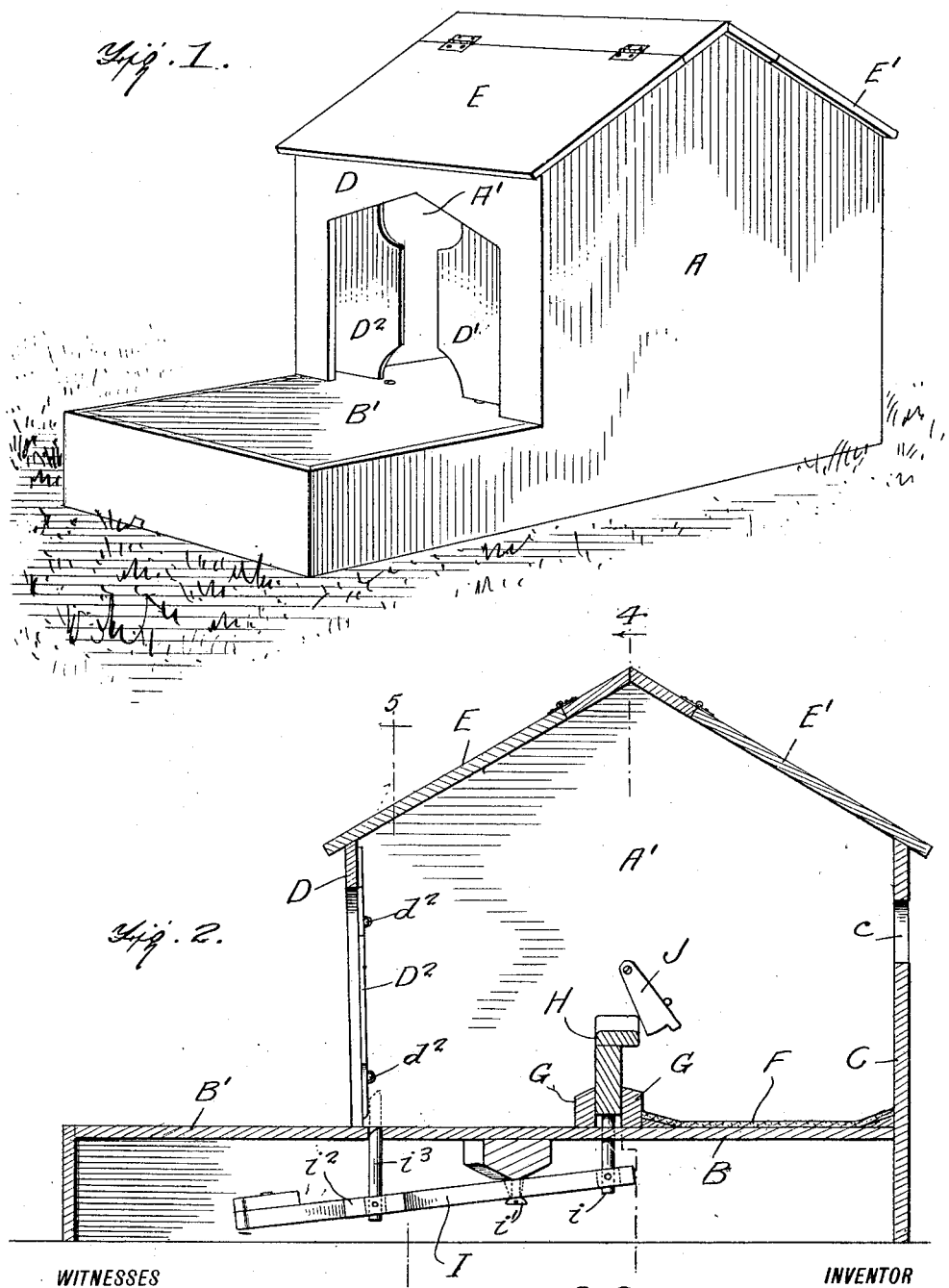

1,112,217.

Patented Sept. 29, 1914.
2 SHEETS—SHEET 2.

WITNESSES

INVENTOR
A. G. REINHOLD KELLER,
BY
ATTORNEYS

UNITED STATES PATENT OFFICE.

ADAM G. REINHOLD KELLER, OF ALAMEDA, CALIFORNIA.

TRAP-NEST.

1,112,217.  Specification of Letters Patent.  Patented Sept. 29, 1914.

Application filed March 4, 1914. Serial No. 822,318.

*To all whom it may concern:*

Be it known that I, ADAM G. REINHOLD KELLER, a citizen of the United States, and a resident of Alameda, in the county of Alameda and State of California, have invented a new and useful Improvement in Trap-Nests, of which the following is a specification.

My present invention relates to trap nests utilized for trapping hens in order that accounts may be kept of the numbers of eggs laid by each hen, and the object of my invention is to provide a construction for accomplishing this purpose, of such a nature as that there will be minimum danger of frightening the birds either as they enter the nest or are trapped therein.

Figure 3:
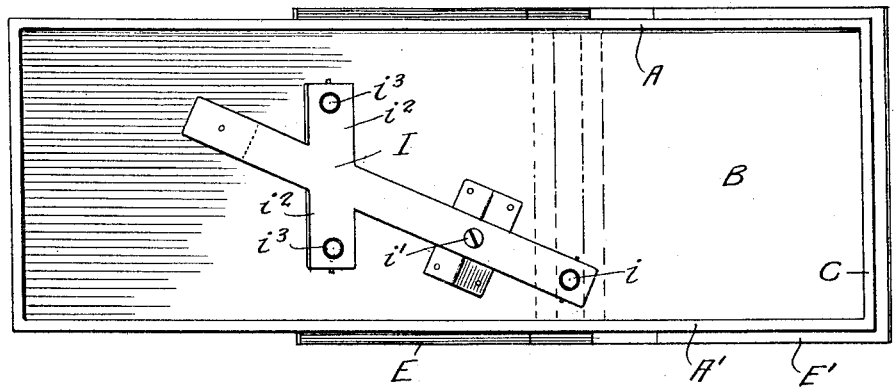
Figure 4:
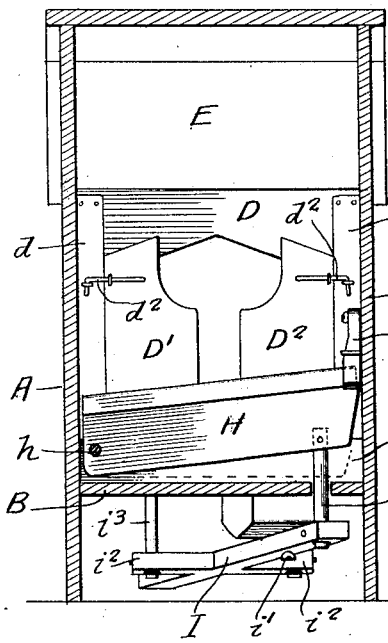
Figure 5:
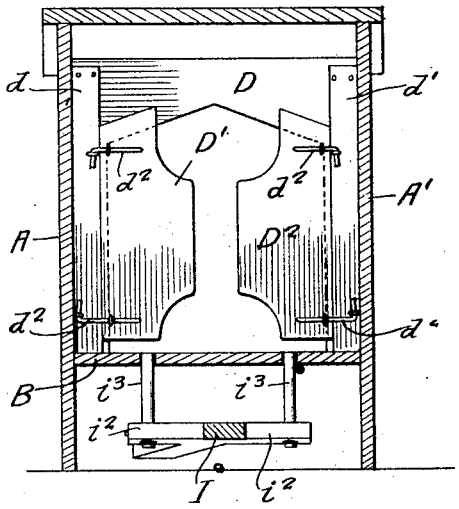

The particular construction by which I accomplish the above is shown in the accompanying drawings, forming a part of this specification, and in which, Figure 1 is a perspective view of my improved trap nest. Fig. 2 is a vertical longitudinal section taken therethrough. Fig. 3 is a bottom plan view thereof. Fig. 4 is a vertical transverse section taken therethrough substantially on line 4—4 of Fig. 2, and Fig. 5 is a similar view taken therethrough substantially on line 5—5 of Fig. 2.

Referring now to these figures, the side walls A and A' of my improved trap nest are extended forwardly at their lower portions to support the forwardly extended portion B' of the base B, and these side walls A and A' and also the rear wall C are extended below the base B in order to support the latter in spaced position above the ground for the purpose to be hereinafter described. The front wall D which is of substantially the same height as the rear wall C, is cut away to provide an enlarged door opening and the top of the casing is provided with forward and rear hinged covers E and E'.

Mounted upright along the inner side portions of the front wall D are a pair of hinge strips $d$ and $d'$ respectively adjacent the side walls A and A' and to these strips are hingedly connected the outer edges of swinging doors D' and $D^2$, the hinged connections $d^2$ for the doors being such that the latter are movable by gravity to the closed position in which they extend in alinement with one another and against the inner surface of the front wall D as seen in Figs. 1 and 2. In this position the inner adjacent edges of the doors D' and $D^2$ are spaced apart as shown and their upper and lower portions are preferably cut away in order that a minimum area of the doors will necessarily contact with the body of the bird as the latter enters the casing of the trap nest by pushing the doors inwardly on their hinged connections before stated.

The interior of the trap nest casing is divided into forward and rear compartments, by means of spaced parallel guides G and G' extended transversely across the base B, and between which guides is extended the lower portion of a vertically movable partition wall H, this partition wall being pivoted at one end by a horizontal pin $h$ extended through the guides G and G' adjacent to the side wall A. Upon this pivot so formed, the partition wall H is vertically movable and its opposite free end is pivotally connected to the upper end of a pin $i$ which depends through an aperture in the base B and is pivotally connected there below to the rear end of a lever I.

A gravity locking piece J is pivoted upon the side wall A' above the free end of the partition wall H and is movable by its own weight into engagement with the said strip when the latter is lowered in order that it may be prevented from again rising.

The lever I located in the space before mentioned below the base B is pivotally supported by a pivot member $i'$ extending therethrough adjacent its rear end and is provided adjacent its forward end with lateral extensions $i^2$ to the extremities of which are pivotally connected the lower ends of up-standing pins $i^3$ mounted through openings in the base B and adapted to be projected vertically above the base B when the lever I is rocked on its pivot $i'$ by lowering movement of the partition strip H.

The pins $i^3$ are located at points immediately in the rear of the doors D' and $D^2$ and in their vertical projected positions as shown in dotted lines in Fig. 2 they prevent the doors from opening.

Thus with the parts in the normal unlocked position as shown in Fig. 2 a hen approaches the casing upon the forwardly extended portion B' of the base and passes into the casing through the doors D' and $D^2$ which as before stated freely swing inwardly for that purpose. The hen may then pass into the rear compartment of the casing wherein the nest is located by first stepping upon the partition strip H which lowers under the weight and is locked in lowered position by the swinging movement of the gravity latch piece J thereover. Simultaneous with the lowering movement of the partition strip H the lever I is rocked on its pivot $i'$ and its forward end raised to project the locking pins $i^3$ upwardly at the rear of the doors D' and $D^2$, thus locking the latter. In this manner the hen is locked or trapped within the nest and is forced to remain until released after her number has been taken and the egg, if any has been laid, has been noted. The hen may be permitted to jump out of the nest by raising the forward cover E and at the same time the operator may raise the rear cover E' and release the operating parts by swinging the latch piece J rearwardly to permit the partition strip H to move vertically and lower the locking pins $i^3$ below the lower edges of the doors D' and $D^2$.

Thus it will be noted that but slight movement of the partition strip H is necessary for the purposes stated and it is such that there is little danger of frightening the hen. Furthermore the locking of the doors is accomplished by means of locking pins and the operation is practically noiseless.

The rear wall C may have an opening $c$ adjacent its upper end in order to effect a free circulation of air through the casing between the spaced inner adjacent edges of the doors.

I claim:

1. In a trap nest of the character described, the combination of a casing consisting of front, rear and side walls, the former of which is cut away to provide a door opening, a base having a portion extended forwardly of the front wall, the said side and rear walls being extended below the base in order to support the latter in elevated position, hinged covers closing the upper portion of the casing, doors hinged upon the inner sides of the door opening having their contiguous inner faces spaced apart and cut away at their upper and lower portions, transverse parallel guides extended across the base within the casing and dividing the latter into forward and rear compartments in the latter of which the nest is located, a vertically movable partition strip mounted between the guides and pivoted adjacent one end, a gravity latch piece mounted upon the inner surface of one of the side walls within the casing and movable to engage the free end of the partition strip in lowered position, a pin connected to the partition strip adjacent its free end and depending through the base, a lever pivoted intermediate its ends beneath the base and to the rear end of which the said depending pin is pivotally connected, the said lever being provided adjacent its forward end with lateral projections, and door locking pins pivotally secured to the said lateral projections and extending vertically through the base at points immediately in the rear of the swinging doors, all for the purpose described.

2. In a trap nest, the combination of a casing having a door opening at one side, doors hinged to swing inwardly at the door opening, a vertically movable member disposed within and across the casing at the front of the nest, means for locking the said member in lowered position, a lever intermediately pivoted below the casing and to the rear of which said vertically movable member is connected, and locking pins extending vertically from the said lever forwardly of its pivot and up-standing through the base of the casing at the inner sides of the said swinging doors.

3. In a trap nest, the combination of a casing having a door opening, inwardly swinging doors hinged at the sides of the door opening and having their adjacent inner edges spaced apart and cut away at the upper and lower portions thereof, and means for locking the said doors against inward movement including pins vertically movable through the base of the casing at the inner sides of the doors, a vertically movable member within the casing, and connections between the said vertically movable member and the said locking pins whereby to move the latter upwardly against the doors when the former is lowered.

A. G. REINHOLD KELLER.

Witnesses:
JOHN WILHELM,
C. J. HAMMOND, Jr.